United States Patent [19]
Fruth et al.

[11] 3,825,084
[45] July 23, 1974

[54] SHUT-OFF MECHANISM FOR LOW PRESSURE LINES CONNECTED TO HIGH PRESSURE LINES IN NUCLEAR REACTORS

[75] Inventors: Hans Fruth, Buckenhof; Wolfgang Müller, Erlangen, both of Germany

[73] Assignee: Siemens Aktiengesellschaft, Munich, Germany

[22] Filed: May 16, 1972

[21] Appl. No.: 253,881

[52] U.S. Cl. ............... 176/65 RE, 176/60, 137/563
[51] Int. Cl. ............................................ G21c 15/18
[58] Field of Search ........... 137/563, 569, 494, 509, 137/533, 533.11, 505.39, 60, 65, 295; 251/63.5

[56] References Cited
UNITED STATES PATENTS

| | | | |
|---|---|---|---|
| 3,249,506 | 5/1966 | Tower et al. | 176/60 X |
| 3,377,800 | 4/1968 | Spillmann | 176/60 X |
| 3,563,508 | 2/1971 | DeLorenzo | 251/63.5 |
| 3,629,060 | 12/1971 | Schmidt | 176/60 X |
| 3,632,231 | 1/1972 | Bloom | 417/295 |

Primary Examiner—William R. Cline
Attorney, Agent, or Firm—Kenyon & Kenyon Reilly Carr & Chapin

[57] ABSTRACT

A control mechanism is disclosed for shutting off a low pressure liquid or gas line connected to a high pressure line. The control mechanism may be comprised of a piston controlled check valve mounted in the lower pressure line. The upper side of an actuator piston in the check valve is connected to the high pressure input side of the input line so that whenever the pressure at the input side becomes high, the check valve is closed. To open the valve a pump or other pressure generator is mounted after the valve and is connected by a pressure line to the lower side of the actuator piston. A safety valve is mounted within this pressure line to insure that a high pressure cannot be formed in this line to force the check valve open. To permit opening of the valve when required, a valve controlled, pressure equalization line is connected between the input line and the intake side of the pump.

12 Claims, 1 Drawing Figure

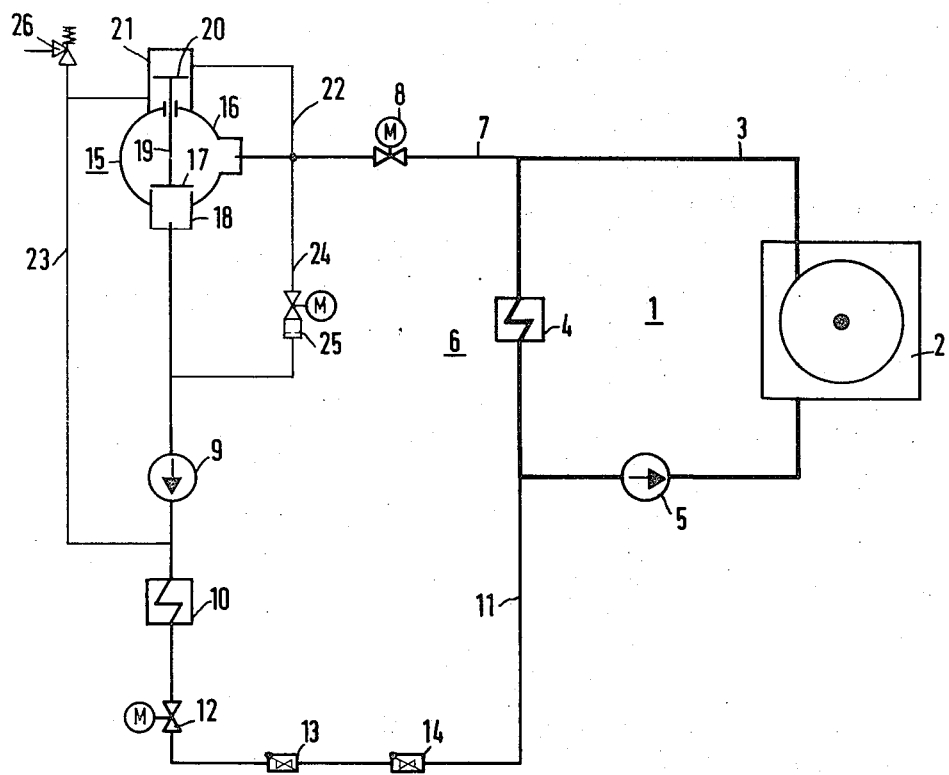

SHUT-OFF MECHANISM FOR LOW PRESSURE LINES CONNECTED TO HIGH PRESSURE LINES IN NUCLEAR REACTORS

BACKGROUND OF THE INVENTION

1. Field of the Invention

This invention is concerned with a control mechanism for nuclear reactors, more particularly with a shut-off mechanism for low pressure lines connected to high pressure lines in a nuclear reactor.

2. Description of the Prior Art

In water cooled nuclear reactors, various auxiliary circuits are connected to the primary reactor circuit. These auxiliary circuits, designed for low pressure, are operated at a pressure lower than that of the primary circuit. In this context, the after-cooling circuit of the reactor has special significance. Although it serves no function when the reactor operates at normal output, it only becomes operative when the reactor is being shut down and a relatively low pressure exists in the primary circuit. During this operation coolant is taken from the primary circuit by a large cross-sectional tap line. In the after-cooling system, heat is removed from the coolant and the coolant is then fed back into the primary circuit. When the reactor is in the power generating mode, for safety reasons, it is extremely important to maintain the after-cooling system in a ready condition and, moreover, to maintain an open connection with the atmosphere through the flooding tank. However, the after-cooling system must be safely shut-off from the primary circuit. To reliably shut-off the feed line into the reactor circuit of the after-cooling system is no problem and, as an example, automatic check valves can be used. However, it is not directly possible by this method to shut-off the input line of the after-cooling system. Here, in order for the valves to close or be kept closed, if a predetermined pressure limit is exceeded, motor driven valves which are electrically interlocked through pressure measuring devices, have customarily been used. For dual safety reasons, two such valves are customarily used in tandem.

However, in order to further increase the safety of the line against faulty opening, it is desirable to additionally or individually secure the input line by an automatic mechanical cut-off which requires no external power for its operation.

It is therefore an object of this invention to form such a shut-off device to reliably protect the after-cooling circuit against faulty opening if the pressure is too high.

SUMMARY OF THE INVENTION

The object of the invention is accomplished by the use of a piston controlled check valve built into the after-cooling input line in which the upper side of the actuator piston is connected by a pressure line with the high pressure input side of the input line. The lower side of the actuator piston is connected by another pressure line to either the pressure side of an after-cooling pump or to another pressure generator which follows the check valve and operates to open the check valve.

By the use of such a shut-off mechanism the closing pressure of the check valve is additionally amplified by the control piston and the control line so that faulty opening in a highly dangerous pressure range is impossible. Furthermore, the pressure line for opening the check valve is additionally protected by a safety valve which constitutes an upper limit on the pressure and therefore has the effect that, even with the after-cooling pump (or the other pressure generator) operating, the piston cannot be moved towards opening if the pressure on the input side of the valve is still too high.

In order to assure that the check valve reliably opens for after-cooling, the input line and the intake side of the after-cooling pump are connected to each other by a valve controlled pressure equalization line to provide pressure relief for the valve. In order to increase the reliability, a motor driven shut-off valve is arranged ahead of the piston controlled check valve.

BRIEF DESCRIPTION OF THE DRAWING

The design and operation of an embodiment of the invention will be explained more fully with the aid of a schematic drawing.

DESCRIPTION OF THE PREFERRED EMBODIMENT

The primary circuit 1 consists of the reactor 2 in which the coolant heats up, the main coolant line 3, the steam generator 4 and the main coolant pump 5. In order to simplify the illustration, the primary circuit is shown as only one circuit, whereas normally at least two circuits are provided.

The after-cooling circuit 6 consists of the usual input line 7 having a motor operated valve 8, the after-cooling pump 9, the after-cooler 10, a control valve 12 as well as the feed line 11 into the primary circuit 1. Backflow through this feed line 11 from the primary circuit 1 is arrested by two check valves 13 and 14. In order to increase the safety of the after-cooling circuit 6 against accidental or unintentional invasion from the high pressure circuit, a piston controlled check valve 15 is inserted, according to the invention, in the low pressure circuit ahead of the after-cooling pump 9. This check valve 15 consists of the housing 16 in which the valve disc 17, in its normal position, gravitationally shuts off the discharge opening 18 of the valve. A stem 19 leads from the valve disc 17 to the actuator piston 20 which is guided within the fully enclosed pressure housing 21.

From the upper side of the piston a pressure line 22 is inserted to connect with the input line 7 and the inlet (high pressure) side of the valve 15. Therefore, in the event of a pressure increase in the primary circuit 1 and with the upper side of the piston 20 connected to the high pressure line an additional closing force acts upon the valve disc 17. A control line 23 also leads to the lower side of the piston 20 in order to open the valve 15 as explained below. This control line 23 is protected by a directly or indirectly attached safety valve 26 in such a manner that no pressure higher than a predetermined opening pressure can occur in this line. Because the pressures acting on the valve 17 through high pressure line 7 and piston 20 in the closing direction are always larger than the pressure acting in the opening direction, and because the valve is encapsulated and designed without bringing the stem to the outside, it is thereby assured that the valve will either be closed or cannot be opened by hydraulic forces if the pressure on the input side 7 is unduly high.

Because the flow through the valve 17 in after-cooling operation must be accomplished, the following devices and means are provided for opening this valve by countering the high pressures acting to close this valve.

A control line 23 is connected to the pressure side of the after-cooling pump 9. With the pump 9 operating and the feed line 11 shut off, pressure to open valve 17 is transmitted through control line 23 to the lower side of the piston 20. This corresponds to the pressure head of the pump 9 at zero output. However, in order to assure that the pressure level in the after-cooling circuit 6 is high enough so that the opening force generated by the pump is sufficient to open the valve, a bypass line 24 of small cross-section is connected between the high pressure input line 7 and the intake side of the pump 9. If line 24 is opened by the motor operated valve 25, the pressure is equalized between the input and output side of the check valve 15 so that no additional closing forces are caused by the high pressure on the valve 17.

The piston area of piston 20 must be selected so that the valve 15 remains open at the operating pressure head of the pump 9 so that flow passes through the valve. This open condition also occurs with the pump 9 operating and the control lines open, however, this is possible only if the pressure predetermined by valve 26 is not exceeded. To insure this, safety valve 26 must be capable of venting bypass line 24 through pump 9.

By inserting such a piston controlled check valve, in addition to a motor controlled valve 8 in the input line 7, two completely independent shut-off devices of high reliability are therefore available. One of which, moreover, operates automatically. A high degree of safety against faulty opening of the input line of the after-cooling system therefore exists.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A shut-off mechanism for a low pressure line having an input and an output connection to a high pressure line comprising
    a control valve means connected to the input connection of the low pressure line, having a pressure responsive means therein for shutting off the low pressure line whenever high pressure occurs at the input to the low pressure line, and
    an actuator means connected to the control valve means, the actuator means also being responsive to high pressures at the input to the low pressure line and adapted to actuate the control valve means by applying an additional closing force to said pressure responsive means therein to shut off the low pressure line when the high pressure occurs at the input to the low pressure line.

2. A shut-off mechanism for a low pressure line having an input and an output connection to a high pressure line as in claim 1 further comprising an opening means connected to the control valve means and adapted to open the control valve means by applying an opening force to the pressure responsive means therein through the actuator means.

3. A shut-off mechanism for a low pressure line having an input and an output connection to a high pressure line as in claim 2 in which the input to the opening means is connected at the output of the control valve means and the output of the opening means is connected to the control valve means, and a valve control means is connected between the input to the low pressure line and the input to the opening means whereby the pressures between the input and the output of the control valve means can be equalized to reduce the closing force applied to the pressure responsive means and permit opening of the control valve means by the opening force applied by the actuator means.

4. A shut-off mechanism for a low pressure line having an input and an output connection to a high pressure line as in claim 3 in which a safety valve means is connected to the pressure line between the opening means and the control valve means for limiting the opening force applied to the pressure responsive means by the actuator means.

5. A shut-off mechanism for a low pressure line having an input and an output connection to a high pressure line as in claim 1 wherein the low pressure line comprises an after-cooling line for a nuclear reactor and in which the high pressure line comprises the primary coolant line for the nuclear reactor.

6. A shut-off mechanism for a low pressure line having an input and an output connection to a high pressure line as in claim 1 in which
    the control valve means comprises a piston controlled check valve connected to the input connection of the low pressure line,
    the pressure responsive means comprises the control piston of the check valve, and
    in which the actuator means comprises an actuator piston coupled to the control piston of the check valve, the actuator piston having its upper side connected to the input of the low pressure line whereby the additional closing force is exerted upon the control piston of the check valve when the pressure in the high pressure input portion increases.

7. A shut-off mechanism for a low pressure line having an input and an output connection to a high pressure line as in claim 6 further comprising a pump, the intake side of which is connected to the output of the piston controlled check valve, and the pressure output side of which is connected to the lower side of the actuator piston whereby the piston controlled check valve can only be opened when the opening pressure force applied by the pressure output of the pump is greater than the sum of the pressures on the upper side of the actuator piston and the control piston of the check valve.

8. A shut-off mechanism for a low pressure line having an input and an output connection to a high pressure line as in claim 7 in which the intake side of the pump is connected by a valve controlled pressure equilization line to the input of the low pressure line whereby upon operation of the valve in the equalization line the pressure is equalized between the input and the output side of the piston controlled check valve to permit opening of the piston controlled check valve by the pump.

9. A shut-off mechanism for a low pressure line having an input and an output connection to a high pressure line as in claim 7 in which a safety valve is connected to the pressure line between the pump and the low side of the actuator piston to facilitate opening of the check valve.

10. A shut-off mechanism for a low pressure line having an input and an output connection to a high pressure line as in claim 9 further comprising a motor operated shut-off valve connected before the piston controlled check valve.

11. A shut-off mechanism for a low pressure line having an input and an output connection to a high pressure line as in claim 9 further comprising a motor operated shut-off valve connected after the piston controlled check valve.

12. A shut-off mechanism for a low pressure line having an input and an output connection to a high pressure line as in claim 7 further comprising a separate pressure generator connected to the actuator piston to open the check valve.

* * * * *